United States Patent

[11] 3,568,875

| [72] | Inventor | Edward Olan |
| | | 33 Piper Drive, Searington, N.Y. 11507 |
| [21] | Appl. No. | 814,735 |
| [22] | Filed | Apr. 9, 1969 |
| [45] | Patented | Mar. 9, 1971 |

[54] COMBINATION PET FOOD CONTAINER AND DISPENSER
7 Claims, 5 Drawing Figs.

[52] U.S. Cl.................................................. 220/54, 220/66
[51] Int. Cl.................................................. B65d 17/24, B65d 7/42
[50] Field of Search.......................................... 220/54, 69, 27, 70, 66

[56] References Cited
UNITED STATES PATENTS
| 2,012,213 | 8/1935 | Young.......................... | 220/66 |
| 3,189,214 | 6/1965 | Henchert..................... | 220/54 |
| 3,314,569 | 4/1967 | Seiferth et al................ | 220/54 |
| 3,435,982 | 4/1969 | Sneed.......................... | 220/70 |

Primary Examiner—George T. Hall
Attorney—Irving Seidman

ABSTRACT: This disclosure is directed to a combination pet food container and dispenser in which the bottom of the container is concave or dish shaped so that a pet or animal may feed directly from the container in which the pet food is packaged and distributed. The container is also provided with a readily removable lid which hermetically seals the contents of the container until used, and is constructed so that the open edge of the container is devoid of sharp edges when used as a feeding dispenser.

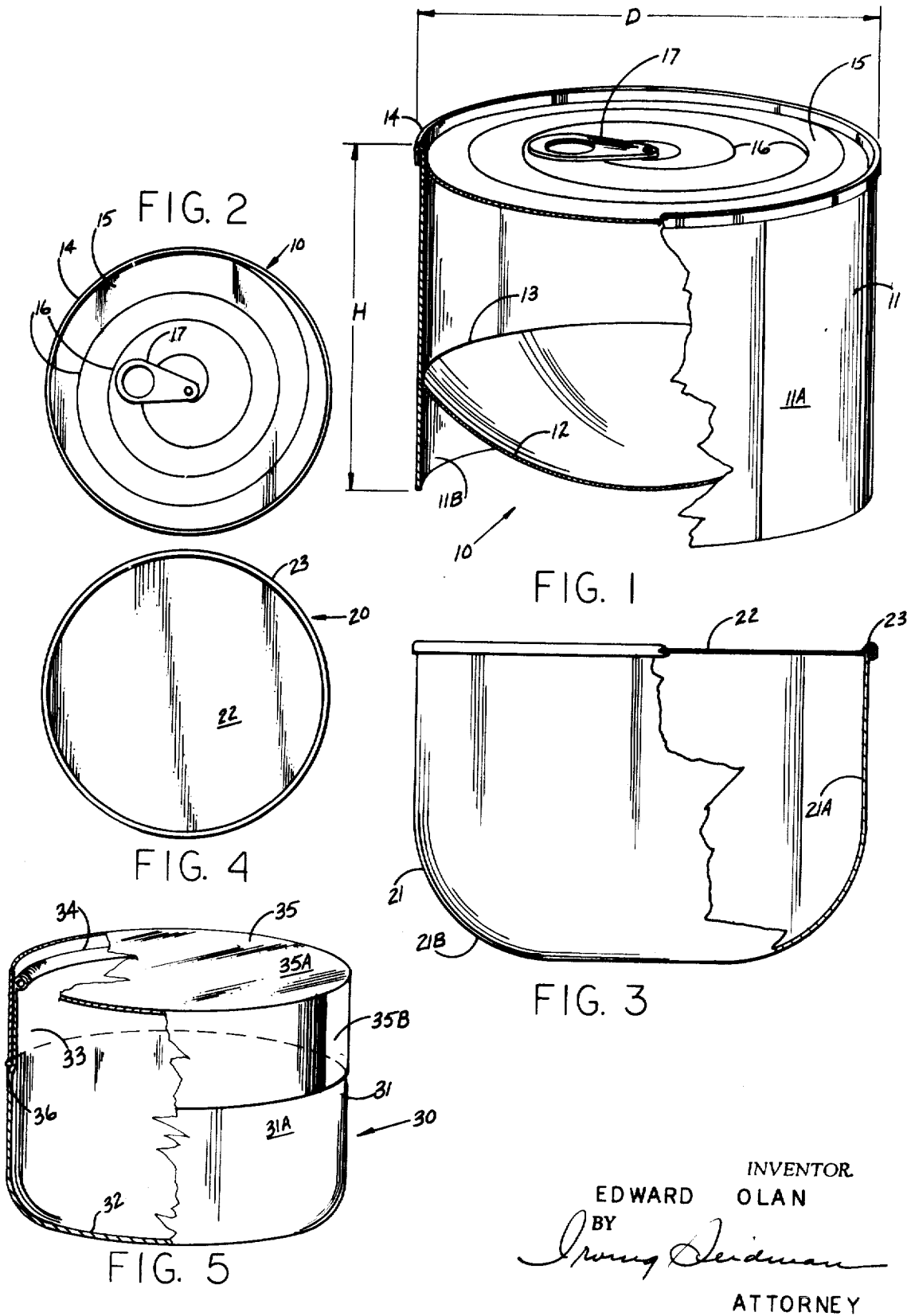

COMBINATION PET FOOD CONTAINER AND DISPENSER

Heretofore pet food such as dog and/or cat food has been packaged and distributed in conventional tin-type cans. Consequently to feed such canned food to a pet, the pet owner invariably had to scoop or remove the pet food from its container and place the contents thereof in the pet's feeding bowl. Thus the feeding of the pet resulted in a generally distasteful and disagreeable task since many pet owners dislike the direct handling of such pet foods.

It is therefore an object of this invention to provide an improved can construction which will function both as the means for packaging and dispensing the pet food.

Another object is to provide an improved can construction for distributing and dispensing a pet food to eliminate the necessity for a pet owner to directly handle the pet food.

Another object is to provide a combined pet food container and dispenser having a readily movable closure, which is free or devoid of sharp edges when the container is used as a feeding bowl.

BRIEF SUMMARY OF INVENTION

The combined pet food container and dispenser of this invention comprises a tubular wall member having one end closed by a bottom wall which is concaved inwardly of the container to define a bowllike bottom. The other end of the container is closed by a hermetically sealed lid or end closure which is constructed so as to be readily removable. Means are provided so that when the lid or end closure is removed, the free edges of the container circumscribing the opening thereto are devoid of sharp edges. The container is further shaped with a diameter-to-height ratio, i.e., D/H, that is approximately one or greater.

FEATURES

A feature of this invention resides in a combined pet food container for maintaining pet food hermetically sealed and which when opened will function as a pet bowl from which a pet can directly feed, thereby eliminating the heretofore disagreeable task of transferring the pet food from the can in which it was packed to the pet feeding bowl.

Another feature resides in the provision of a combined pet food container and dispenser which when used as a pet feeding is devoid of sharp edges.

Other features and objects will become more readily apparent when considered in view of the drawings and specifications in which:

FIG. 1 is a prospective view of a combined pet food container and dispenser embodying this invention.

FIG. 2 is a plan view of FIG. 1 illustrated in a reduced scale.

FIG. 3 illustrates an elevation view of a modified form of the invention having portions thereof broken away.

FIG. 4 is a plan view of FIG. 3 to a reduced scale.

FIG. 5 is a perspective view of another modified form of the invention having portions thereof broken away.

Referring to FIGS. 1 and 2 of the drawings there is shown therein a combined pet food container and dispenser 10 constructed in accordance with this invention. As shown, the combined pet food container and dispenser 10 comprises a body 11 formed of an upwardly extending tubular wall member 11A which is formed of any suitable material, as for example, metal, plastic and the like. Adjacent the lower end of the tubular member 11A there is disposed a bottom wall 12 to close one end of the body 11. As shown, the bottom member 12 is concaved inwardly of the container to define a bowl-shaped or dish-shaped bottom wall, and the bottom wall 12 is suitably secured to the end wall 11A.

In the illustrated embodiment of FIG. 1, the bowl-shaped bottom wall 12 is connected to the end walls along a line of contact 13 intermediate the opposed ends of the tubular body 11A so that the lower portion 11B of the circumscribing wall 11A defines a skirt to support can 10 on a supporting surface.

The upper end of the tubular member 11A is reversely bent to define a circumscribing bead 14 at the upper end thereof. A lid or end closure 15 is suitably secured to the upper end of the tubular member 11A, in a manner well known in the can or container industry.

The sealing of the lid or end closure 15 is such as to provide a seal so as to preserve the quality of the pet food adapted to be packaged and distributed within the container 10.

In the form of the invention illustrated, in FIGS. 1 and 2, the end closure or lid 15 is provided with a spiral score 16 to define a frangible or easy tear line along which the upper lid will fracture when a force is applied thereto, thereby rendering the lid or end closure 15 readily removable from the container without the aid of any mechanical can opener. To facilitate the opening or tearing of the end closure 15 along the score line 16, there is provided a pull tab 17 which when pulled with a sufficient amount of force will cause the score lines 16 to rupture. In doing so, the lid can be readily removed from the upper end of the container. The arrangement is such that when the entire lid is removed from the end of the can, the circumscribing edge is devoid of sharp edges. The bead 14 thus remaining will protect the animal from injury with respect to the open end of the can during feeding. The construction described contemplates that the pet can feed directly from the opened can 10.

To permit the pet or animal to free access to the food contained within the container 10, the diameter to height ratio of the container 10, that is the D to H ratio is specifically formed so that it will approximate one or be greater than one. That is D(The diameter) is made substantially equal or greater than H (the height of the can). With the construction described it will be noted that pet food can be readily packaged and distributed in a can 10 as herein described, and that the ultimate user, upon removal of the lid or end closure 15, can readily utilize the same container safely, as the feeding bowl for the animal. Thus the construction described provides a readily expendable feeding bowl in which the pet food itself can be packaged for distribution and sale. The construction further eliminates the heretofore disagreeable task of transferring pet food from its packaging container or can to the pet's feeding bowl.

FIGS. 2 and 3 illustrate a modified form of the invention. In this form of the invention the container 20 comprises an integrally formed body having upright circumscribing end walls 21A and an integrally formed dish-shaped bottom wall 21B. The upper end or closure 22 is hermetically sealed to the end wall 21A of the container in a circumscribing bead construction 23 in a manner well known in the can industry. To effect the opening of the can construction of FIG. 3 a conventional can opener is required. In this form of the invention the ultimate consumer need only to remove the lid 22 of the can 20 by applying a conventional can opener thereto, and upon removal of the lid the pet can then be fed directly from the can 20. The curvilinear formation of the bottom wall 21B is such as to permit the animal to reach of the pet food contained in the container. In this form of the invention also the diameter-to-height ratio is made similar to that described with respect to FIG. 1.

FIG. 5 illustrates another modified form of the invention. In this form the container 30 comprises a body 31 having a circumscribing end wall 31A closed at one end by a curvilinear bowl-shaped bottom wall 32. As seen the upper portion 33 of the body 31, adjacent the open end thereof is displaced laterally inwardly, and the upper end 34 terminates in a reversely bent circumscribing bead. The bead 34 thus renders the body devoid of sharp edges about the opened end thereof.

A readily removable closure 35 is suitably fitted to the upper end of the container. The closure 35 comprises a top 35A having a depending circumscribing flange 35B which is adapted to snuggly receive the offset portion 33 of the body 31. Accordingly as seen in FIG. 5 the degree of offset 33 is equal to substantially the thickness of the material of the flange 35B so that in the assembled position, as shown, the outer circumference of the closure 35 is substantially uniform to the outer circumference of the body 31. A suitable easy tear hermetic seal 36 secures the flange 35B of the closure 35 to the body 31 of the container 30. It will be noted that the container 30 of FIG. 5 can be readily opened so as to permit the dispensing of pet food directly from the body 31 of the container 30 by simply fracturing or breaking the hermetic seal 36 securing the top 35 to the body 31 of the container 30.

If desired the flange 35B of the lid or closure 35 and the offset portion 33 of the container body 31 may be provided with complementary threads and/or bayonet fittings whereby the closure 35 may be made readily removable by rotation of the closure 35 relative to the body 31.

With respect to the form of FIG. 5, the lid or closure 35 is further constructed so that it can be readily replaced upon the body 31 of the container so as to protect or store any unfinished portion of the pet food within the container 30. In this manner the unfinished portion can be sanitarily saved until the next feeding.

In each of the illustrated forms of the invention the Diameter D to height H ratio of the container is such as to permit an animal ready access to the food contained therein. Also the shape of the bottom wall of the respective containers 10, 20 or 30 is such as to permit the animal to reach into the can and have access to all of the food contained therein. The container is constructed so that when used as a feeding bowl, the edge surrounding the opening is free of sharp edges thereby providing maximum safety for the animal.

While the instant invention has been described with respect to several embodiments thereof it will be readily understood and appreciated that variations and modifications may be made without departing from the spirit or scope of the invention.

I claim:

1. A container for packaging and distributing pet food and for feeding a pet comprising:
   a circular tubular wall member having a diameter-to-height ratio equal to substantially one;
   an arcuately shaped bottom wall connected to said tubular wall member, said bottom wall being concaved interiorly of said container, said bottom wall merging with the tubular wall to form a transition at the junction of said bottom wall and tubular wall member devoid of a ledge or corner;
   a closure spaced from said bottom wall to define a closed volume for containing a predetermined quantity of pet food; and
   said closure being readily removable to define a full opening to said container devoid of sharp edges.

2. The invention as defined in claim 1 wherein said closure is spirally scored to define a frangible closure, and a pull tab connected to said closure adjacent the end of said spiral score to facilitate the opening of said container.

3. The invention as defined in claim 1 wherein said tubular member includes a skirt portion circumscribing the bottom wall, the end of said skirt defining a base for supporting said container on a supporting surface.

4. The invention as defined in claim 1 wherein said latter means includes a bead circumscribing the upper end of said tubular member.

5. A combination pet food container and dispenser comprising:
   a full opened end container having tubular end walls and a bottom wall connected thereto;
   said bottom wall being concave inwardly of said container;
   said tubular end walls adjacent the opening thereof having a reversely bent edge portion to define a circumscribing bead;
   and a closure for sealing the upper end of said container;
   said closure including a top having a depending circumscribing flange;
   said flange being adapted to snuggly embrace the beaded edge of said container; and
   means for hermetically sealing the flange of said closure to the wall of said container.

6. The invention as defined in claim 5 wherein the diameter to height ratio (D/H) of said container is equal to one approximately.

7. The invention as defined in claim 5 wherein the ratio (D/H) of the container is greater than one.